United States Patent [19]

Harms

[11] Patent Number: 5,143,157

[45] Date of Patent: Sep. 1, 1992

[54] CATALYST FOR BREAKER SYSTEM FOR HIGH VISCOSITY FLUIDS

[75] Inventor: Weldon M. Harms, Duncan, Okla.

[73] Assignee: Halliburton Company, Duncan, Okla.

[21] Appl. No.: 717,753

[22] Filed: Jun. 19, 1991

[51] Int. Cl.$^5$ ............................................. E21B 43/26
[52] U.S. Cl. .................................. 166/300; 166/308; 252/8.551; 252/315.3
[58] Field of Search ............................... 166/300, 308; 252/8.551, 315.3; 106/198; 526/88

[56] References Cited

U.S. PATENT DOCUMENTS

| | | | |
|---|---|---|---|
| 3,719,663 | 3/1973 | Klug | 536/88 |
| 3,779,914 | 12/1973 | Nimerick | 166/308 X |
| 3,816,151 | 6/1974 | Podlas | 106/198 X |
| 4,250,044 | 2/1981 | Hinkel | 166/308 |
| 4,504,400 | 3/1985 | Willard | 252/8.551 |
| 4,560,486 | 12/1985 | Hinkel | 166/308 X |
| 4,609,475 | 9/1986 | Hanlon et al. | 252/8.551 X |
| 4,647,385 | 3/1987 | Williams et al. | 166/308 X |
| 4,930,575 | 6/1990 | Falk | 166/300 X |
| 4,969,526 | 11/1990 | Cawiezel | 166/250 |
| 5,054,552 | 10/1991 | Hall et al. | 252/8.551 X |

*Primary Examiner*—George A. Suchfield
*Attorney, Agent, or Firm*—Robert A. Kent

[57] ABSTRACT

A persulfate/catalyst breaker system is disclosed which effects controlled breaks of polysaccharide gelled fluids in the ambient temperature range without interfering with fluid performance. The catalyzing constituent of the breaker system comprises at least one member selected from the group of erythorbic acid or its salts, hydroxylamine hydrochloride, dihydroxymaleic acid and its salts, citric acid and its salts and a copper ion releasing compound.

16 Claims, No Drawings

CATALYST FOR BREAKER SYSTEM FOR HIGH VISCOSITY FLUIDS

BACKGROUND OF THE INVENTION

1. Field of the Invention

This invention relates to a method of reducing the viscosity of a fracturing fluid utilized to stimulate a subterranean formation by incorporation of a catalyst or activator for the breaker system.

2. Description of the Prior Art

In the production of hydrocarbons or other fluids from subterranean rock formations penetrated by wellbores, a commonly used technique for stimulating such production is to create and extend fractures in the formation. Most often, the fractures are created by applying hydraulic pressure to the subterranean formation from the wellbores penetrating them. That is, a fracturing fluid is pumped through the wellbore and into a formation to be fractured at a rate such that the resultant hydraulic pressure exerted on the formation causes one or more fractures to be created therein. The fractures are extended by continued pumping of fluid which may contain additives such as sand or other insoluble particulate proppant material to facilitate flow of hydrocarbons through the fractures to the wellbore. To facilitate the fracturing process and transport of the propping agent into the created fracture, the fracturing fluid normally is thickened, viscosified, or gelled by incorporation of a gelling agent in the fluid. After completion of the fracturing process, in order to effect clean-up of the gelled fluid, a breaker additive or system is typically employed which helps lower significantly the viscosity of the fracturing fluid thereby permitting or facilitating return of the fluid to the wellbore for cleaning the fracture passageway for the production of hydrocarbons.

Fracturing fluid systems comprising aqueous solutions of polysaccharide compounds are well known in the art. One particularly desirable system for lower temperature formations, that is formations having a temperature below about 140° F., is an aqueous solution of a polysaccharide that is crosslinked with a borate ion source although other transition metals also may be utilized to crosslink the polysaccharide. Of particular interest are borate crosslinked systems employing galactomanan gums such as guar or modified guars such as hydroxypropylguar.

One known breaker system for polysaccharides employs ammonium or alkaline metal persulfates to break the gel. However, in relatively low temperature formations a breaker aid such as disclosed in U.S. Pat. Nos. 4,250,044 or 4,969,526 comprising a tertiary triethanolamine compound has been utilized to accelerate the rate of breaking of the gel.

It would be desirable to provide alternate methods by which the ammonium or alkaline metal persulfates can be catalyzed or activated to break a polysaccharide gel at temperatures below about 140° F.

SUMMARY OF THE INVENTION

The present invention provides a group of compounds which effectively assist or catalyze the breaking of a polysaccharide fracturing gel or crosslinked polysaccharide fracturing gel at relatively low temperatures using a persulfate breaker system while not interfering with the gelling or crosslinking of the gels.

In accordance with the invention, a subterranean formation penetrated by a wellbore wherein the static temperature of the wellbore adjacent the formation is at a temperature below about 140° F. and most preferably in the range of from about 35° F. to 130° F. is fractured by a method comprising injecting into the wellbore and into contact with the formation at a rate and pressure sufficient to fracture the formation an aqueous fluid comprising:

(a) an aqueous liquid;
(b) a viscosity increasing amount of a polysaccharide which is soluble or dispersible in the aqueous liquid, and
(c) as a breaker to reduce the viscosity of the fluid after said fluid has contacted the formation and after its intended purpose has been served, the combination comprising an effective amount of (i) at least one compound selected from the group consisting of ammonium persulfates and alkali metal persulfates in at least partially water-soluble form and (ii) at least one compound selected from the group consisting of erythorbic acid or its salts, hydroxylamine hydrochloride, gluconic acid and its salts, deltagluconolactone, isomers of deltagluconolactone, thiourea, hydroxylamine hydrobromide, hydroxylamine sulfate, hydrazine monohydrochloride, hydrazine dihydrochloride, hydrazine sulfate, hydrazine monobromide, hydrazine dibromide, hydroquinone, ferrous ammonium sulfate, ferric ammonium sulfate, di-hydroxymaleic acid and its salts, citric acid and its salts and a copper ion releasing compound.

The aqueous fracturing fluid also may include a borate releasing compound or transition metal ion source to effect crosslinking of the polysaccharide and any other conventional additives for fracturing fluids such as pH adjusting agents, bactericides, clay stabilizers, surfactants, proppant agents and the like.

DETAILED DESCRIPTION OF THE PREFERRED EMBODIMENT

The present invention relates to methods of improving viscosity control of fluids utilized in the stimulation of subterranean formations such as by fracturing and more particularly with regard to catalyzing or activating a breaker system for a viscosified fluid utilized to fracture a relatively low temperature subterranean formation. The present invention is suitable for use in a formation having a temperature below about 140° F. and preferably from about 35° to 135° F. and most preferably from about 60° to about 125° F.

The fluid employed in the practice of this invention may be substantially any aqueous liquid such as fresh water, natural or synthetic brines, sea water or the like.

The viscosifying or gelling agent employed in the present invention includes natural and derivatized polysaccharides which are soluble, dispersible, or swellable in an aqueous liquid to yield viscosity to the fluid. One group, for example, of polysaccharides which are suitable for use in the present invention include gum arabic, gum ghatti, gum karaya, tamarind gum, tragacanth gum, guar gum, locust bean gum and the like. Modified gums such as carboxyalkyl derivatives, like carboxymethyl guar, and hydroxyalkyl derivatives, like hydroxypropyl guar also can be employed. Doubly derivatized gums such as carboxymethylhydroxypropyl guar (CMHPG) can also be used. Modified celluloses and derivatives thereof also can be employed. There are thus literally thousands of such materials which have varying properties that can be employed in the practice of the present invention, for example, cellulose ethers, esters and the like.

In general, any of the water-soluble cellulose ethers can be used in the practice of the invention. Those cellulose ethers which can be used include, among others, the various carboxyalkyl cellulose ethers, such as carboxyethyl cellulose and carboxymethyl cellulose (CMC); mixed ethers such as carboxyalkyl ethers, such as carboxymethyl hydroxyethyl cellulose (CMHEC); hydroxyalkyl celluloses such as hydroxyethyl cellulose (HEC) and hydroxypropyl cellulose; alkylhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; and alkylalkyl celluloses such as methylethyl cellulose; and hydroxyalkylalkyl celluloses such as hydroxypropylmethyl cellulose; and the like. Most preferred polysaccharides are the galactomanans, modified or derivative galactomanans, and cellulose derivatives, examples of which are given above.

The chemistry and materials involved in the preparation of polysaccharide gelled fluids of the type described above is well understood in the art. As is well understood, the amount of gelling or viscosifying agent employed in the aqueous gel depends upon the desired viscosity of the solution. The gelling agent generally is present in an amount of from about 10 to about 100 pounds per 1000 gallons of fluid. The preferred concentration is in the range of from about 20 to about 60 pounds per 1000 gallons of fluid.

The fluid may include a crosslinking agent to further enhance the development of viscosity by crosslinking the gelling agent in the fluid. The crosslinking agent can comprise a borate releasing compound or any of the well known transition metal ions which are capable of creating a crosslinked structure with the particular gelling agent utilized. Examples of such crosslinking agents sources include a borate releasing compound such as sodium tetraborate, aluminum, zirconium or titanium chelates, antimony compounds and the like. The crosslinking agent may react with the gelling agent to create an immediate crosslink or the crosslinking agent may be of the delayed type whereby the onset of the crosslinking can be controlled to permit introduction of the fluid into a wellbore before the viscosity significantly increases.

The fluid also may include any of the other conventional additives such as proppant solids, pH control agents, bactericides, clay stabilizers, surfactants and the like which do not adversely react with the other constituents to inhibit performance of the desired treatment upon a subterranean formation.

The breaker system for the gelled fluid comprises an effective amount of at least one compound selected from he group consisting of ammonium and alkali metal persulfates in at least partially water soluble form and at least one compound selected from the group consisting of erythorbic acid or its salts, hydroxylamine hydrochloride, gluconic acid and its salts, deltagluconolactone, isomers of deltaglucono-lactone, thiourea, hydroxylamine hydrobromide, hydroxylamine sulfate, hydrazine monohydrochloride, hydrazine dihydrochloride, hydrazine sulfate, hydrazine monobromide, hydrazine dibromide, hydroquinone, ferrous ammonium sulfate, ferric ammonium sulfate, dihydroxymaleic acid and its salts, citric acid and its salts and a copper ion releasing compound such as for example cupric or cuprous chloride. Neither the persulfate or the other constituent of the breaker system is effective alone, at the concentration utilized, in the temperature range embraced by the present invention, within a commericially practical time. The compounds individually evidence inefficient activity in the lower and ambient temperature range and a subdued activity at the upper portion of the range without significantly increasing the concentration of the breaker present in the fluid.

The amount of breaker employed is that amount required to reduce the viscosity of a given gelled fluid at a temperature below about 140° F. to a preselected lower viscosity or to a complete break as most desired within a desired period of time. The optimum or effective amount of breaker employed in the present invention depends on factors such as the injection period desired, the particular gelling agent and its concentration, the particular breaker utilized, the formation temperature and other factors. Typically, however, from about ¼ to about 12 pounds of persulfate is employed per 1000 gallons of fluid and from about 0.1 to about 10 pounds of the second or other constituent to the breaker system per 1000 gallons of fluid. Most preferably the second constituent is present in an amount of about 0.25 to about 8 pounds per 1000 gallons of fluid. It is to be understood that each constituent is not necessarily effective over the entire general concentration range set forth above, however, the individual constituents are generally effective over some portion of the range described. The optimum proportions depends on the conditions of the specific application and the constituents utilized.

To further illustrate the present invention, but not by way of limitation, the following examples are provided.

EXAMPLE I

The following tests were performed to demonstrate the effect various breakers have upon the gelled fluid or crosslinked gelled fluid. The base gel fluid comprised a solution of 2% KCl containing 30 pounds of purified guar gum per 1000 gallons of fluid. The base gel was prepared by admixing tap water, an approximate quantity of KCl, guar gum and pH buffer in a Waring blender. The pH buffer comprised 0.25 gallons per 1000 gallons of a solution of 50:50 ammonium acetate and acetic acid. The gel was permitted to hydrate for about 30 minutes after which it was mixed together with a pH adjusting compound comprising 0.5 gallons per 1000 gallons of diethanolamine, the designated breaker system and 1.5 pounds/1000 gallons of a borate releasing compound comprising disodium octaborate tetrahydrate which is capable of crosslinking the hydrated guar. The samples then were monitored to determine whether a break occurred. The various temperatures were achieved by placing samples in a water bath maintained at the indicated temperature.

TABLE

| Test No. | Test °F. | Breaker system Sodium Persulfate lb/1000 gal fluid | Second Constituent and Concentration (C) lb/1000 gal fluid | | Viscosity, cp at 511 sec$^{-1}$ 1 hr | 6 hr | overnight |
|---|---|---|---|---|---|---|---|
| 1 | 75 | 2 | Citric acid | (.5) | C | C | C |
| 2 | 100 | 2 | Citric acid | (.5) | C | C | 6 |
| 3 | 120 | 2 | Citric acid | (.5) | C | 6 | — |
| 4 | 75 | 5 | Citric acid | (.5) | C | C | C |
| 5 | 100 | 5 | Citric acid | (.5) | C | 47 | 2.5 |
| 6 | 120 | 5 | Citric acid | (.5) | WC | — | — |
| 7 | 75 | 5 | Hydrochloride Hydroxylamine | (1.5) | C | WC | 21 |
| 8 | 100 | 5 | Hydroxylamine Hydrochloride | (1.0) | WC | 9.0 | — |
| 9 | 120 | 5 | Hydroxylamine Hydrochloride | (1.0) | 12 | — | — |
| 10 | 100 | 2 | Hydroxylamine Hydrochloride | (.5) | C | 18 | 5 |
| 11 | 75 | 2 | Hydroxylamine Hydrochloride | (1.5) | C | <9.5 | — |
| 12 | 100 | 2 | Thiourea | (.25) | C | C | 9.5 |
| 13 | 100 | 2 | Thiourea | (.5) | C | WC | 14 |
| 14 | 100 | 2 | Thiourea | (1.5) | C | WC | 44 |
| 15 | 120 | 2 | Thiourea | (.25) | WC | <8 | — |
| 16 | 75 | 5 | Thiourea | (1.0) | C | C | 10 |
| 17 | 100 | 5 | Thiourea | (1.0) | WC | <8 | — |
| 18 | 120 | 5 | Thiourea | (1.0) | WC | <9 | — |
| 19 | 100 | 2 | CuCl | (.25) | C | 15 | 5 |
| 20 | 100 | 2 | CuCl | (.5) | C | 12.5 | 5 |
| 21 | 100 | 2 | CuCl | (1.0) | C | 12.5 | 6 |
| 22 | 100 | 2 | CuCl | (1.5) | C | 11.5 | 6 |
| 23 | 100 | 2 | Ferrous Ammonium Sulfate | (0.25) | C | 15 | 5 |
| 24 | 100 | 2 | Ferrous Ammonium Sulfate | (1.0) | C | 12.5 | 6 |
| 25 | 100 | 2 | Ferrous Ammonium Sulfate | (1.5) | C | 11.5 | 6 |
| 26 | 100 | 2 | Ferric Ammonium Sulfate | (0.25) | C | C | 7 |
| 27 | 75 | 2 | Deltagluconolactone | (0.25) | C | C | C |
| 28 | 100 | 2 | Deltagluconolactone | (0.25) | C | C | 8.5 |
| 29 | 100 | 2 | Erythorbic Acid | (0.5) | C | C | 4 |
| 30 | 100 | 2 | Erythorbic Acid | (1.0) | C | <8.5 | — |
| 31 | 100 | 5 | Deltagluconolactone | (0.25) | C | 23 | 3.5 |
| 32 | 120 | 5 | Deltagluconolactone | (0.25) | WC | <8 | — |
| 33 | 100 | 2 | Deltagluconolactone | (1.5) | C | WC | 9 |
| 34 | 100 | 5 | Erythorbic acid | (0.5) | C | <6 | — |
| 35 | 100 | 5 | Erythorbic acid | (1.0) | C | <5 | — |
| 36 | 100 | 2 | CuCl$_2$ | (0.5) | C | 47 | 2.5 |
| 37 | 100 | 2 | CuCl$_2$ | (1.0) | C | 41 | 2.5 |
| 38 | 100 | 5 | CuCl$_2$ | (0.5) | C | <5 | — |
| 39 | 100 | 5 | CuCl$_2$ | (1.0) | C | <7 | — |
| 40 | 100 | 2 | Ferric Ammonium Sulfate | (1.0) | C | C | 6 |

C: crosslinked
WC: weakly crosslinked

The result of the foregoing tests clearly illustrate the effectiveness of the various constituents to activate a persulfate breaker at temperatures below 140° F. to break a viscosified fluid to a lower viscosity.

While the present invention has been described in terms of certain preferred embodiments, it is to be understood that various modifications, changes, substitutions and omissions may be made without departing from the spirit thereof. Accordingly, it is to be understood that the scope of the present invention is defined in the following claims.

What is claimed is:

1. A method of fracturing a subterranean formation penetrated by a wellbore wherein the static temperature of the formation adjacent said wellbore is below about 140° F., comprising injecting into the wellbore and into contact with the formation at a rate and pressure sufficient to fracture the formation an aqueous fluid comprising:

(a) an aqueous liquid;

(b) a thickening agent comprising at least one member selected from the group consisting of guar, hydroxypropyl guar, carboxymethylhydroxypropyl guar, carboxymethylhydroxyethyl cellulose and carboxymethylcellulose, present in an amount sufficient to increase the viscosity of said aqueous liquid; and (c) a breaker to reduce the viscosity of the liquid after contact with said formation comprising an effective amount of (i) ammonium persulfates or alkali metal persulfates in at least partially water-soluble form and (ii) a second constituent comprising at least one compound selected from the group consisting of erythorbic acid and its salts, hydroxylamine hydrochloride, deltagluconolactone and its isomers, gluconic acid and its salts, citric acid and its salts and a copper ion releasing compound.

2. The method of claim 1 wherein said thickening agent is present in an amount of from about 10 to about 100 pounds per 1000 gallons of fluid.

3. The method of claim 1 wherein said persulfate is present in an amount of from about ¼ to about 12 pounds per 1000 gallons of fluid.

4. The method of claim 1 wherein said second breaker constituent is present in an amount sufficient to activate the persulfate to break the viscosity of said aqueous fluid.

5. The method of claim 1 wherein said second breaker constituent is present in an amount of from about 0.1 to about 10 pounds per 1000 gallons of aqueous fluid.

6. The method of claim 1 wherein the static temperature of the formation is in the range of from about 60 to about 125° F.

7. The method of claim 1 wherein said aqueous fluid includes a crosslinking agent capable of crosslinking said thickening agent to further increase the viscosity of the fluid over that achieved by the thickening agent alone.

8. The method of claim 7 wherein said crosslinking agent comprises at least one member selected from the group of borate-releasing compounds, a source of titanium ions, a source of zirconium ions, a source of antimony ions and a source of aluminum ions.

9. The method of claim 7 wherein said crosslinking agent is delayed in the rate at which it crosslinks the thickening agent after admixture therewith in the aqueous liquid.

10. A method for reducing the viscosity of a viscous aqueous fluid at temperatures below about 140° F. said fluid containing a viscosity increasing amount of a thickening agent comprising at least one member selected from the group consisting of galactomannans, modified or derivatized galactomannans and cellulose derivatives, comprising providing in said fluid a breaker to reduce the viscosity of the fluid which comprises an effective amount of (i) ammonium persulfate or alkali metal persulfates in at least partially water-soluble form and (ii) a second constituent comprising at least one compound selected from the group consisting of erythorbic acid and its salt, hydroxylamine hydrochloride, deltagluconolactone, gluconic acid and its salts, dihydroxymaleic acid and its salts, citric acid and its salts and a copper ion releasing compound.

11. The method of claim 10 wherein said second constituent of said breaker comprises at least one compound selected from the group consisting of hydroxylamine hydrochloride, citric acid and its salts, a copper ion releasing compound.

12. In an aqueous fluid for use in treating subterranean formations at temperatures within the range of from about 35° to about 130° F. which are penetrated by a wellbore, said fluid containing
    (a) as a thickening agent to increase the viscosity of said fluid, from about 10 to about 100 pounds per 1000 gallons of fluid, a water soluble, dispersable or swellable polysaccharide comprising at least one member selected from the group of guar, hydroxypropylguar, hydroxyethylcellulose and carboxymethylhydroxyethylcellulose and
    (b) a breaker to reduce the viscosity of said fluid after a period of time comprising an effective amount of (i) ammonium persulfate or alkali metal persulfate in at least partially water-soluble form and (ii) a second constituent comprising at least one compound selected from the group consisting of erythorbic acid and its salts, hydroxylamine hydrochloride, dihydroxymaleic acid and its salts, deltagluconolactone and isomers thereof, gluconic acid and its salts, citric acid and its salts and a cupric ion releasing compound.

13. The fluid of claim 12 wherein said fluid also contains a crosslinking agent for said thickening agent which functions to further increase the viscosity of said fluid upon crosslinking said thickening agent in said fluid.

14. The fluid of claim 12 wherein said second constituent of said breaker comprises at least one member selected from the group of hydroxylamine hydrochloride, citric acid and its salts and a cupric ion releasing compound.

15. The fluid of claim 12 defined further to include a crosslinking agent for said thickening agent.

16. The fluid of claim 15 wherein said crosslinking agent comprises at least one member selected from the group of borate-releasing compounds, a source of titanium ions, a source of zirconium ions, a source of antimony ions and a source of aluminum ions which is capable of crosslinking said thickening agent under the temperature conditions to which said fluid is subjected during use.

* * * * *